Figures 1, 2:
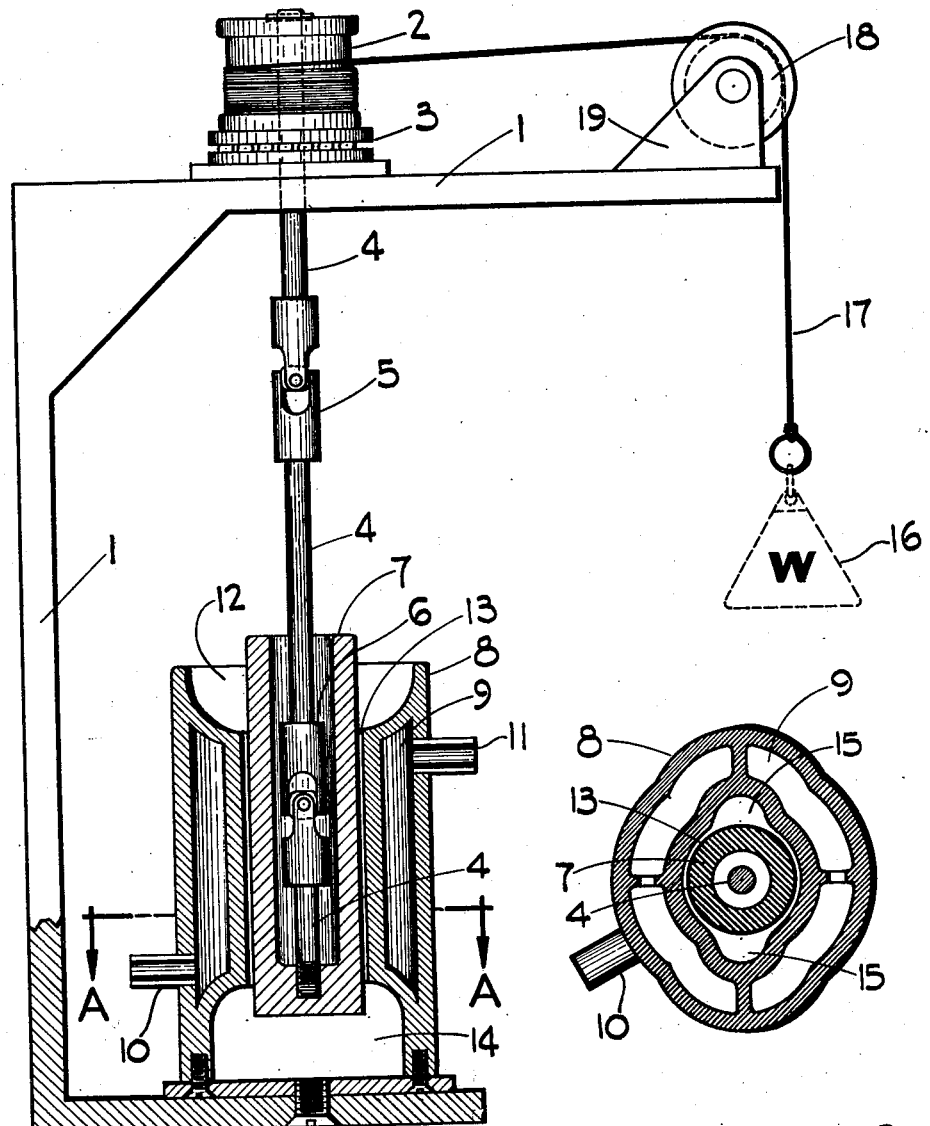

Sept. 24, 1957 W. K. ASBECK 2,807,160
HIGH SHEAR VISCOSIMETER
Filed Oct. 26, 1951 2 Sheets-Sheet 1

INVENTOR
WALTER KARL ASBECK
ATTORNEY

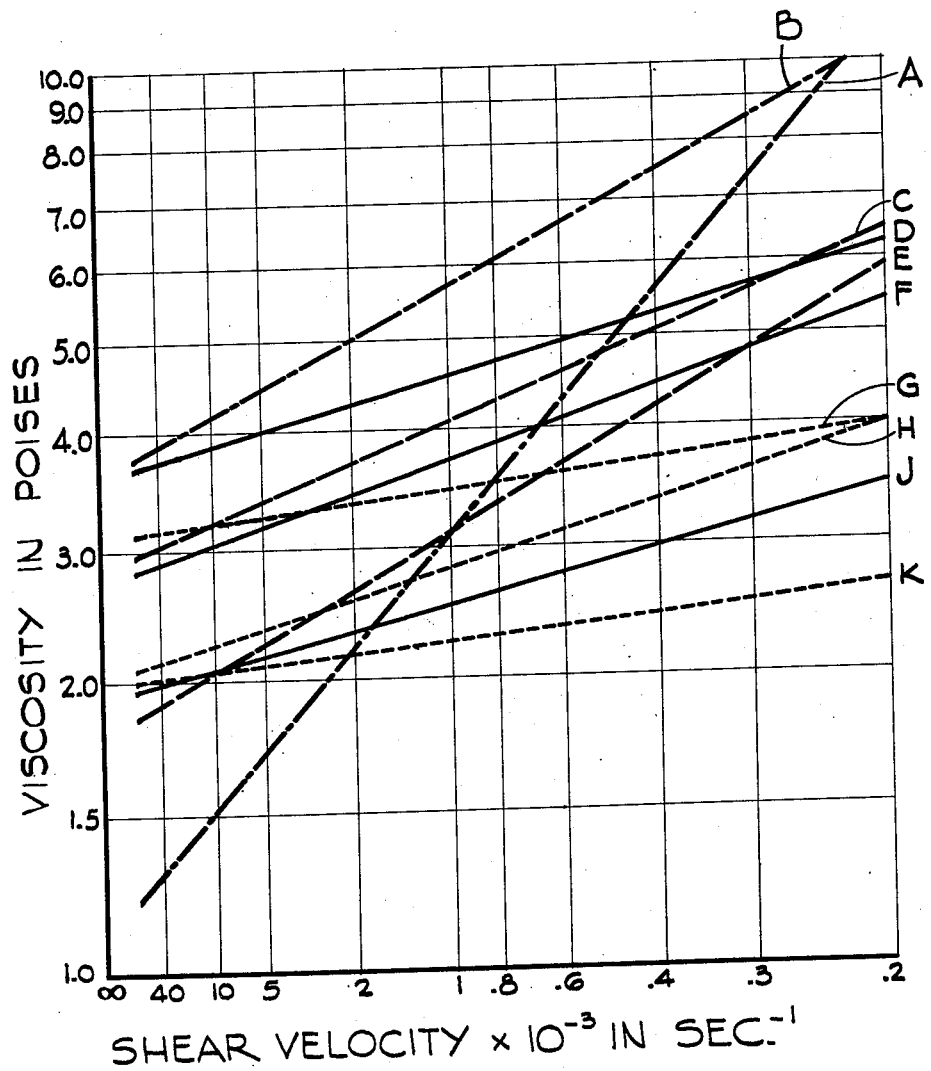

United States Patent Office 2,807,160
Patented Sept. 24, 1957

2,807,160

HIGH SHEAR VISCOSIMETER

Walter K. Asbeck, Palos Heights, Ill., assignor to The Sherwin-Williams Company, Cleveland, Ohio, a corporation of Ohio Application October 26, 1951, Serial No. 253,337

3 Claims. (Cl. 73—60)

This invention relates to a rotary type viscosimeter capable of viscosity measurement of multiphase liquid systems at high shear velocities.

More particularly, this invention relates to an improved rotary type viscosimeter which is self-centering during operation, in which the annular space or depth between the suspended bob or rotor and the stator element may be accurately maintained at a predetermined dimension, and which, because of the particular design of the stator element, makes possible consideration of non-Newtonian qualities of liquid systems and the instrumental determination of the brushability of paints.

Heretofore, brushability as a quality could only be determined by submission of test samples to application tests by painters who had been in the painting and decoration field long enough to qualify as experts. Because human factors were impossible of elimination by such tests, personnel preferences were inherent in the evaluations thus made. A practical instrument capable of indicating a reproducible numerical measurement of brushability has long been needed in the paint industry.

Failures of previous attempts to correlate viscosity data obtained with prior art instrumentation as compared with actual brushing qualities is believed due to failure to recognize the high shear velocities to which a paint is subjected during brush application. Shear velocities essential to the determination of brushability are in the order of 10,000 to 40,000 reciprocal seconds upon application of a film of from $2.5 \times 10^{-3}$ to $7.5 \times 10^{-3}$ cm. thick at a brushing rate of about three feet per second or 90 cm. per second, as paint is normally applied by the average painter. Viscosimeters in use in the paint industry are limited to shear velocities not appreciably greater than 1,000 reciprocal seconds, hence are incapable of reflecting a value of interest relating to the brushability factor of paints.

The unit of measure herein referred to of reciprocal seconds is based upon a mathematical simplification of the concepts involved. Shear velocity is defined as the unit distance traversed in one plane of fluid flow in relation to another plane of fluid flow per second along the shear path per unit depth of the fluid film subjected to shear. Dividing out the common terms, shear velocity is expressed in reciprocal seconds.

In contemplation of high shear velocities of the magnitude of interest, many problems arise in the design of a test method and test apparatus. Capillary types of instruments are not desired as the shear velocity gradient $$\frac{dv}{dr}$$

varies from a maximum at the capillary wall to zero at the center and do not reflect non-Newtonian characteristics. Falling ball viscosimeters are obviously limited in application. Rotational viscosimeters may be used to produce high shear rates by increasing rotational velocities and decreasing the annular space between the internal and external shearing surfaces of the stator and the rotor or bob respectively. However, as it is necessary to maintain an exact concentricity of the internal surface of the stator with the external surface of the bob or rotor in order to obtain definable and comparative shear velocities, either the thickness of the annulus must be kept relatively large or excessively complicated centering devices must be employed to maintain a precise clearance between the shearing surfaces. To obtain the shear velocities essential for brushability measurement, a consistent and accurate concentric clearance of less than 500 microns, and preferably from 40 to 100 microns must be maintained. Because paint systems are pigmented, allowance for the particle size of the disperse phase is necessary.

If one elects to specify a relatively thick film in the annular space between the stator and bob or rotor surfaces, materially increased rotational speeds are essential to produce shear rates of the magnitude heretofore stated to be essential. As the heat conductivity of many paints and paint-like materials is relatively low, and heat is rapidly generated at high rotational velocities, dissipation of heat through thick films becomes a most difficult problem. Changes in temperature seriously impair the accuracy and reproducibility of the data obtained by operation of the instrument. This limitation confines the depth of the annular space to magnitudes below 500 microns. As pigmentary dispersions in some grades of paint are as large as 40 microns, it is, of course, essential to allow sufficient space to accommodate the pigmentary agglomerates and particles, else the accuracy of the determination be affected by extraneous considerations. However, where colloidal dimensions are involved, then the annular depth may be reduced to several microns. From this it can be seen that the annular depth may be varied from several microns to something less than 500 microns, depending upon the nature of the pigment-vehicle system or colloidal dispersion under investigation.

Additionally in attempting to correlate the brushability of a paint system with viscosity, it is necessary to consider that paint systems are, more often than not, non-Newtonian in character. That is, paint systems often develop structure which is referred to as thixotropy in the more prevalent instance and dilatancy in less prevalent instances. Broadly, the first term, thixotropy, relates to materials which thin out upon agitation but which tend to gel upon coming to a state of rest. Dilatancy relates to systems in which the resistance to flow increases upon agitation. These factors are also significant in the brushability of a paint system and are accounted for by a simple form of the instrument as described in greater detail.

It is the object of this invention, therefore, to provide a rotational viscosimeter having a clearance of less than 500 microns between the inner surface of the stator element and the outer surface of the bob or rotor element capable of development of a shear velocity between the said surfaces of from about 10,000 to about 40,000 reciprocal seconds at relatively low rotational speeds.

It is a further object of this invention to provide an apparatus for determining the quality of a paint system as to its brushability by subjecting the paint material to a shear velocity in excess of 10,000 reciprocal seconds and determining the viscosity at that shear rate.

It is a further specific object of this invention to provide an instrument which will indicate the quality of brushability of a paint system by a measurement of viscosity characteristics at high shear rates, taking into consideration the generally non-Newtonian characteristic of multiphase liquid systems.

The brushability viscosimeter is described briefly as follows: A stator cup is provided having a jacket about its exterior for temperature control. The interior wall of the element defining the outer periphery of the shear test area of the stator element is essentially cylindrical, with the exception of a plurality of symmetrically disposed wells opening into the annulus between rotor and stator. Alternatively, said wells may be incorporated into the rotor element. A cylindrical bob element is suspended within the inner periphery of the stator element allowing a clearance of less than 500 microns between the inner concave wall of the stator and the outer convex rotor wall by a driven shaft operating through a universal joint in association with the rotor element and at least one other universal joint between the first universal and the power source for the rotor driving means. The plurality of universal joints in the driving shaft makes accurate centering of the stator in relation to the rotor unnecessary. Upon rotating the rotor within the stator element in the presence of a test material within the annular space, forces are developed creating self-centering of the rotor and exact control of film depth within the annulus between rotor and stator. The wells in the stator or rotor elements, as the case may be, hold material under tests of considerable film thickness, or of such thickness that any additional depth of said wells would not materially affect the physical state of the paint undergoing evaluation. The depth of the wells may therefor be defined as of infinite thickness as compared with said annular depth. In other words, upon rotation of the rotor or bob, paint material under test stored in the well volumes is fed from the wells into the annulus as other test material is returned to the wells from the annular volume as the rotor or bob member is caused to rotate.

In the simplest form of my invention as shown in the drawings, Figure 1, the viscosity in poises of a given multiphase system is determined from the time required for the weight W to fall through a standard distance. Viscosity in poises is calculated from the equation:

$$V = \frac{t}{D}$$

$V$ = viscosity in poises.
$$t = \frac{WG}{K(A_1 - MA_2)}$$
$D$ = shear velocity in reciprocal seconds.
$G$ = gravitational constant.
$W$ = weight in grams.
$K$ = constant of the instrument, a function of the gear ratio of the driving to driven member.
$A_1$ = area of the concave surface of the stator cylinder.
$A_2$ = area of the inner section of $A_1$ cut away to provide for the storage wells.
$M$ = number of wells in annulus periphery.

The value for D, the shear velocity, is calculated from the equation:

$$D = \frac{2(\pi)(d_1)(w)}{(d_2 - d_1)}$$

where $d_1$ = diameter of the bob or rotor.
$w$ = revolutions per second of the bob.
$d_2$ = diameter of stator cylinder.

To illustrate the value of the instrument for determining the brushability of paint systems, a series of commercial paints and enamels were tested for brushability by two master painters, and their comment as to brushability compared with test results graphically portrayed (see Figure 3) at a number of shear velocities. Correlation of test results by the proposed instrument at high shear velocities with the results obtained by human appraisal are obvious. The results further show that lower shear velocities produce data of little value in determining brushability characteristics but that at shear velocities above 10,000 reciprocal seconds correlative data is obtained.

It will be noted from a study of Figure 3 that the acceptable brushing range of viscosity is somewhat different for each class of paints. An experienced painter expects greater ease of brushing in some qualities of paint such as primers and flat wall paints than in other qualities such as house paints and enamels. Maximum durability and performance often require that the product have a certain "feel" in brushing to secure application of films of suitable thickness. From the data of Figure 3, it would appear that merely keeping the viscosity of a paint below a maximum number of poises at brushing shear velocities is sufficient, but the slope of the curves which relate to the "structure" also has its effect upon application characteristics other than brushability, e. g., flow, leveling (brush-marking), etc. Oftentimes a compromise may be essential between ease of brushing and other application characteristics. Temperature also markedly affects brushability, and a paint which may be practical on a summer's day will be objectionable in drag on a cool fall day. Studies made at various temperatures with the herein described viscosimeter have clearly demonstrated the importance of temperature upon brushability.

It will be apparent to one versed in the study of rheological character of multiphase liquid systems that additional refinements known in the art may be incorporated into the viscosimeter herein described. The essentials of my improvement in means for high shear rate viscosity measurement are set forth in the following detailed description taken in conjunction with the attached drawings illustrating a simple and specific embodiment of the invention, in which:

Figure 1 is a side elevation, partially in cross-section.
Figure 2 is a plan view in cross-section through line A—A of Figure 1.
Figure 3 is a graphical plot of test data with respect to tests made of several qualities of paint products.

Referring in particular to the drawings, Figure 1, a standard rotational viscosimeter stand 1 of the Stormer or Wolff-Hoepke type functions to support a rotary driving element 2 operating through a thrust bearing 3, shaft 4, and universal joints 5 and 6 to rotate the cylindrical rotor element 7 within the stator 8 inclosed within a temperature controlling jacket 9 having means for fluid ingress 10 and egress 11. The stator element 8 in position provides a funnel-like top section 12, an annular space 13 between the exterior periphery of the rotor element 7 and the interior periphery of the stator element 8 and a fluid tight reservoir 14 in the stator base.

In the preferred form of the invention there are a plurality of wells 15 of relatively infinite depth, as compared with the annular depth, symmetrically disposed about the periphery of and opening into the annular space 13. These may be a part of the stator, as shown in Figure 2, or may be cut into the rotor 7 without departing in principle from the purpose intended. While the wells 15 are not absolutely essential, a more accurate correlation of instrument test data with human observation, particularly when dealing with non-Newtonian liquids, is obtained. Two wells are sufficient, but more may be employed if desired.

A weight 16 attached to cord 17 running over pulley 18 attached to stand 1 by supports 19 provides a power source for transmission of energy of rotation to the driving element 2. Obviously, more complex driving means and measurement means may be employed embracing refinements in measurement and power control as are well known in the art of viscosimetry.

To operate the instrument, a multiphase liquid is poured into the opening 12 and allowed to fill the annulus 13, reservoir 14 and the wells 15. The instrument is brought to constant temperature by passage of a fluid at constant temperature from orifice 10 through the jacket 9 and out at 11. When the instrument and test liquid reaches constant temperature, the weight 16 is allowed to fall through a measured distance and the time necessary noted. By increasing the mass of 16, increased shear velocities can be obtained. Centering of the rotor within the stator is not essential, as natural forces operating upon the universal joints from the rotation of the rotor cause exact alignment of the rotor with the stator. Because of this fact, exact and uniform thickness of material within the annulus may be maintained during test runs.

Referring now to Figure 3, there will be found a graphical comparison of a number of qualities of protective and decorative coatings. It will be observed that at low shear rates little can be forecast relative to brushability of a paint system. However, at high shear rates, order develops and there is a definite correlation between the viscosity at high shear rate and the brushability of the multiphase systems tested.

From the foregoing description and accompanying drawings, it will be apparent to those skilled in the art that a relatively simple viscosimeter has been described capable of reproducibly measuring the brushability of paint systems having certain novel features hereinafter more particularly pointed out in the appended claims.

I claim:

1. A viscosimeter which comprises in combination a jacketed hollow cylindrical stator element, closed at the base and open at the top, a cylindrical rotor element suspended within said hollow stator by a shaft containing a plurality of universal joints, said shaft suspended from a power source adapted to provide rotational torque through said shaft and universals to said rotor, the depth of the annulus between said rotor and stator elements not exceeding 500 microns and within said annulus a plurality of wells symmetrically disposed about the periphery of and opening into said annular space.

2. A viscosimeter which comprises in combination a jacketed hollow cylindrical stator element, closed at the base and open at the top, a cylindrical rotor element suspended within said hollow stator by a shaft containing a plurality of universal joints, said shaft suspended from a power source adapted to provide rotational torque through said shaft and universals to said rotor, the depth of the annulus between said rotor and stator elements not exceeding 500 microns and within said annulus a plurality of wells of relatively infinite thickness as compared with said annular depth symmetrically disposed about the periphery of and opening into said annular space.

3. A viscosimeter which comprises in combination a jacketed hollow cylindrical stator element, closed at the base and open at the top, a cylindrical rotor element suspended within said hollow stator by a shaft containing a plurality of universal joints, said shaft suspended from a power source adapted to provide rotational torque through said shaft and universals to said rotor, the depth of the annulus between said rotor and stator elements being between 40 and 100 microns in depth and within said annulus a plurality of wells of relatively infinite thickness, as compared with said annular depth, symmetrically disposed about the periphery of and opening into said annular space.

References Cited in the file of this patent

UNITED STATES PATENTS

| | | |
|---|---|---|
| 2,074,174 | Goodier | Mar. 16, 1937 |
| 2,513,505 | Steffens | Oct. 30, 1951 |
| 2,573,505 | Steffens | Oct. 31, 1951 |

FOREIGN PATENTS

| | | |
|---|---|---|
| 513,876 | Great Britain | Oct. 24, 1939 |